W. M. ARNALL.
Grain Separator.
No. 28,046. Patented May 1, 1860.
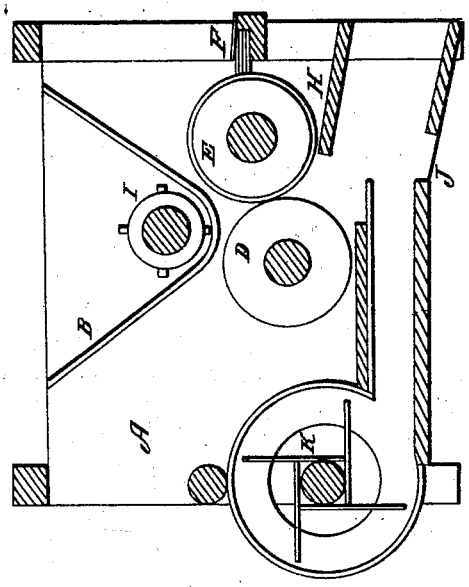
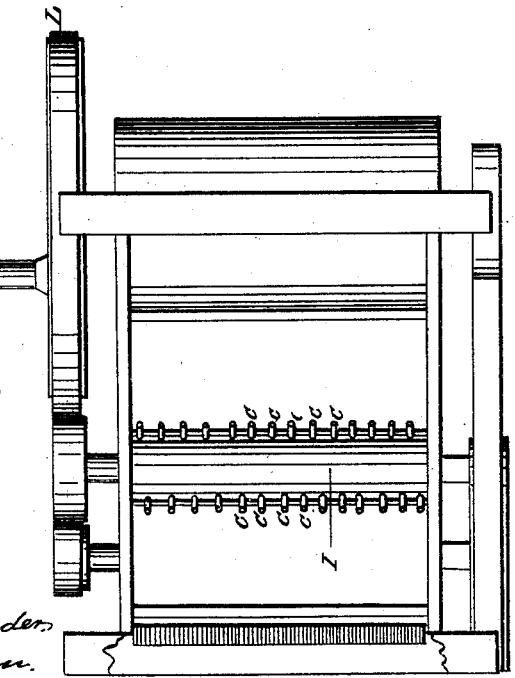
Witnesses:
O. M. Alexander
A. Yeatman
Inventor:
Wm. M. Arnall

UNITED STATES PATENT OFFICE.

WM. M. ARNALL, OF SPERRYVILLE, VIRGINIA.

GRAIN SEPARATOR AND CLEANER.

Specification forming part of Letters Patent No. 28,046, dated May 1, 1860; Reissued July 10, 1860, No. 1,000.

*To all whom it may concern:*

Be it known that I, WM. M. ARNALL, of Sperryville, in the county of Rappahannock and State of Virginia, have invented certain new and useful Improvements in Grain-Cleaning Machines; and I do hereby declare that the following is a full, clear, and exact description of the same, reference being had to the accompanying drawings and to the letters of reference marked thereon.

The nature of my invention consists in constructing and arranging the several parts of this machine substantially in the manner hereinafter specified.

In the annexed drawings, Figure 1 represents a plan view of the machine. Fig. 2 is a vertical section.

In the figures A, represents a frame which is constructed in a substantial manner, and of any convenient size. In this frame is secured a hopper B, which is V shaped as is represented in the drawings. In the bottom, and longitudinally of the hopper, is placed a cylinder I, which is provided on its periphery with teeth or pins $c$, $c$, $c$. This cylinder revolves and the pins upon it serve to distribute and equalize the grain as it passes down to the cylinders.

D, and E, represent two cylinders, which are secured in the frame A, under the hopper B, and parallel with the cylinder I. The cylinder D, has a hard periphery and the cylinder E, is provided with a pliable periphery. The periphery of the cylinder E, may be made pliable by securing cloth or any other suitable substance upon it. I regard cotton felt as a good material for covering the roller or cylinder E. The peripheries of the two cylinders D, and E, are placed close together (touching each other) and when the grain falls from the hopper, it passes between these two cylinders, and the grain being harder than the cockle, the cockle is broken and sticks to the felt upon the cylinder E.

F, represents a brush which is placed longitudinally of the roller or cylinder E, and in such proximity to said cylinder that it will touch it and brush the cockle from its periphery as it revolves.

H, represents a dividing board which is secured under the cylinder E, and is used for the purpose of separating the cockle from the grain, as it is being brushed from the cylinder. The cockle falls upon the board H, and is carried out to the rear of the machine. The grain falls down after passing between the rollers, or cylinders and passes through the opening J, into any receptacle placed beneath the frame for securing it.

The cylinder I is so constructed and arranged with the hopper, that it equalizes the grain in such a manner that it is distributed between the cylinders D, and E, alike at all points. If the grain was permitted to be thicker, or more copiously distributed at one point than another it would be liable to be broken and cracked, and blown away by the fan K which sends a blast of air through the grain as it falls from the cylinders. The three cylinders and the fan are all driven by the same band L, as is seen. They may be driven by gearing or otherwise as may be desirable.

Having thus fully described my invention, what I claim as new and desire to secure by Letters Patent is—

The combination of the distributing and equalizing cylinder I, with the cylinders D, and E, and with the brush F, when the same are used and arranged substantially in the manner and for the purpose described.

WM. M. ARNALL.

Witnesses:
C. M. ALEXANDER,
A. C. YEATMAN.